United States Patent
Johns et al.

(10) Patent No.: US 7,070,729 B2
(45) Date of Patent: Jul. 4, 2006

(54) PRESSWARE DIE SET WITH PRODUCT EJECTORS AT OUTER FORMING SURFACES

(75) Inventors: Albert D. Johns, Saylorsburg, PA (US); Mark B. Littlejohn, Appleton, WI (US); Thomas W. Zelinski, Menasha, WI (US)

(73) Assignee: Fort James Corporation, Atlanta, GA (US)

( * ) Notice: Subject to any disclaimer, the term of this patent is extended or adjusted under 35 U.S.C. 154(b) by 352 days.

(21) Appl. No.: 10/236,721

(22) Filed: Sep. 6, 2002

(65) Prior Publication Data
US 2004/0046284 A1    Mar. 11, 2004

(51) Int. Cl.
B29C 59/03    (2006.01)

(52) U.S. Cl. ............... 264/320; 264/322; 264/334; 425/409; 425/422

(58) Field of Classification Search ............... 264/320, 264/322, 334; 425/403.1, 410, 422, 444, 425/409; 493/149, 152, 168
See application file for complete search history.

(56) References Cited

U.S. PATENT DOCUMENTS

| | | | | | |
|---|---|---|---|---|---|
| 1,919,534 A | * | 7/1933 | Shaw | ............... | 425/543 |
| 2,601,701 A | * | 7/1952 | Sayre | ............... | 264/320 |
| 3,256,375 A | * | 6/1966 | Bolelli et al. | ............... | 264/112 |
| 3,363,040 A | * | 1/1968 | Aoki | ............... | 264/278 |
| 3,811,933 A | * | 5/1974 | Uffner et al. | ............... | 428/422 |
| 4,050,666 A | * | 9/1977 | Van Tichelt | ............... | 249/68 |
| 4,284,400 A | * | 8/1981 | Kaspar et al. | ............... | 425/444 |
| 4,411,579 A | * | 10/1983 | Grone et al. | ............... | 414/416.09 |
| 4,435,143 A | | 3/1984 | Dempsey | ............... | 425/150 |
| 4,479,914 A | * | 10/1984 | Baumrucker | ............... | 264/45.5 |
| 4,609,140 A | | 9/1986 | Van Handel et al. | .... | 229/2.5 R |
| 4,721,500 A | | 1/1988 | Van Handel et al. | ....... | 493/152 |
| 4,755,128 A | | 7/1988 | Alexander et al. | .......... | 425/292 |
| 4,778,439 A | | 10/1988 | Alexander | ............... | 493/169 |
| 4,832,676 A | | 5/1989 | Johns et al. | ............... | 493/152 |
| 5,041,071 A | | 8/1991 | Reasinger et al. | .......... | 493/167 |
| 5,087,188 A | * | 2/1992 | Staver | ............... | 425/116 |
| 5,249,946 A | | 10/1993 | Marx | ............... | 425/142 |
| 5,356,284 A | * | 10/1994 | Sheffield | ............... | 425/556 |
| 5,985,187 A | * | 11/1999 | Weder et al. | ............... | 264/40.1 |
| 6,183,234 B1 | * | 2/2001 | Weder et al. | ............... | 425/136 |
| 6,589,043 B1 | * | 7/2003 | Johns et al. | ............... | 425/403.1 |
| 6,761,844 B1 | * | 7/2004 | Haataja | ............... | 264/123 |
| 6,783,720 B1 | * | 8/2004 | Johns et al. | ............... | 264/320 |
| 2002/0018825 A1 | * | 2/2002 | Starkey | ............... | 425/444 |

* cited by examiner

Primary Examiner—Michael P. Colaianni
Assistant Examiner—Patrick Butler
(74) Attorney, Agent, or Firm—Jacqueline M. Hutter

(57) ABSTRACT

An improved pressware die set includes mechanical ejectors for removing formed product from the punch. A preferred embodiment includes rocker-style ejectors free from edges or other asperities which may tend to snag and mar the product during the production process. Most preferably, the outward surfaces of the rocker members extend beyond the perimeter of a paperboard blank positioned for forming so the paperboard blank does not encounter an obstruent outward edge during forming.

13 Claims, 15 Drawing Sheets

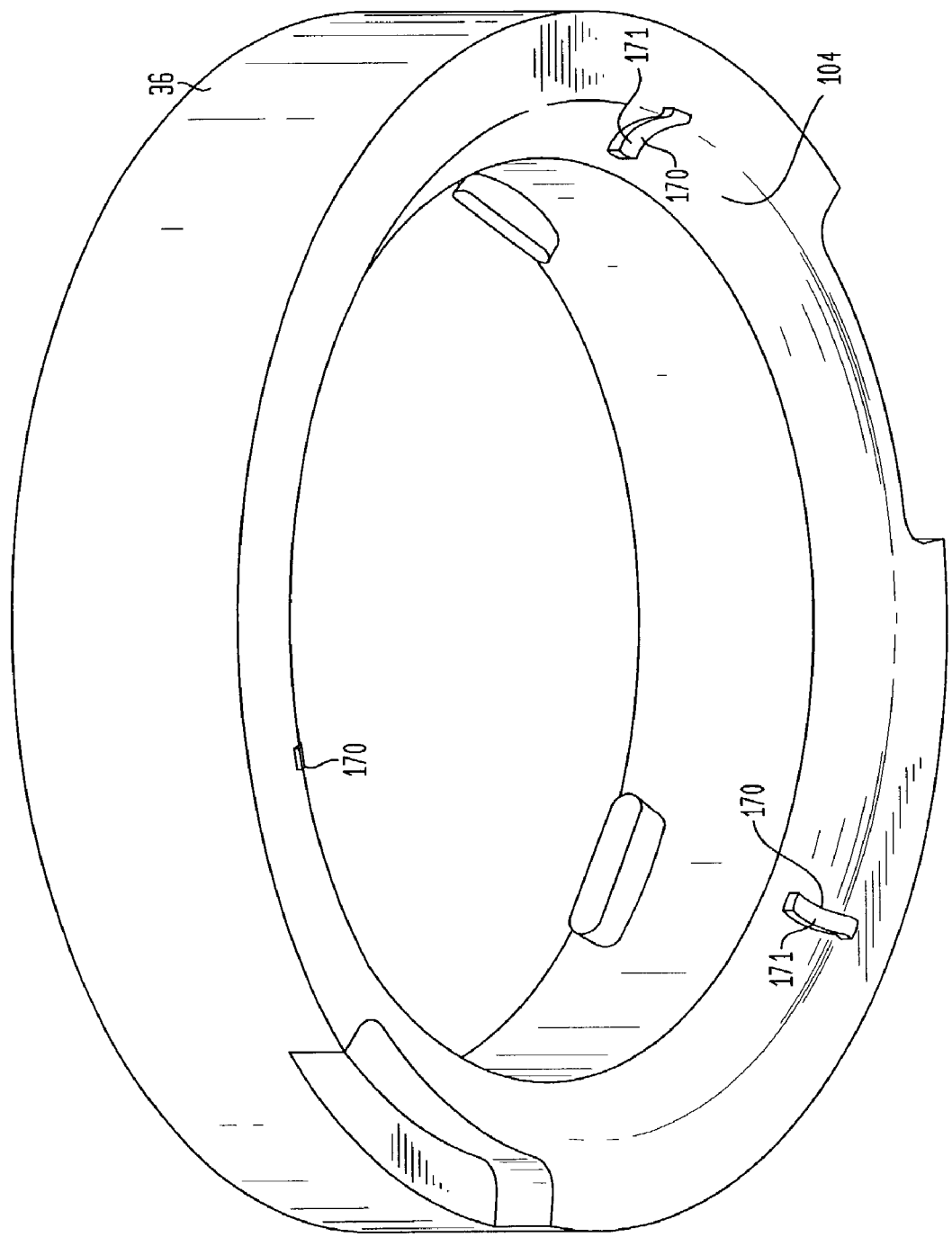

PRESSWARE DIE SET WITH PRODUCT EJECTORS AT OUTER FORMING SURFACES

TECHNICAL FIELD

The present invention is directed to a pressware die set with product ejectors at the outer forming surfaces of the punch. In a preferred embodiment, the ejectors include a rocker-style ejector member which strokes away from the surface of a punch pressure ring when the die set opens.

BACKGROUND ART

Paperboard food containers are typically made by way of pressing a planar paperboard container blank in a matched metal heated pressware die set, as noted in one or more of U.S. Pat. No. 4,606,496 entitled "Rigid Paperboard Container" of R. P. Marx et al; U.S. Pat. No. 4,609,140 entitled "Rigid Paperboard Container and Method and Apparatus for Producing Same" of G. J. Van Handel et al; U.S. Pat. No. 4,721,499 entitled "Method of Producing a Rigid Paperboard Container" of R. P. Marx et al; U.S. Pat. No. 4,721,500 entitled "Method of Forming a Rigid Paper-Board Container" of G. J. Van Handel et al; and U.S. Pat. No. 5,203,491 entitled "Bake-In Press-Formed Container" of R. P. Marx et al. Equipment and methods for making paperboard containers are also disclosed in U.S. Pat. No. 4,781,566 entitled "Apparatus and Related Method for Aligning Irregular Blanks Relative to a Die Half" of A. F. Rossi et al; U.S. Pat. No. 4,832,676 entitled "Method and Apparatus for Forming Paperboard Containers" of A. D. Johns et al; and U.S. Pat. No. 5,249,946 entitled "Plate Forming Die Set" of R. P. Marx et al. The forming section may typically include a plurality of reciprocating upper die halves opposing, in facing relationship, a plurality of lower die halves. The upper die halves are mounted for reciprocating movement in a direction that is oblique or inclined with respect to the vertical plane. The paperboard blanks, after cutting, are gravity fed to the inclined lower die halves in the forming section. The construction of the die halves and the equipment on which they are mounted may be substantially conventional; for example, as utilized on presses manufactured by the Peerless Manufacturing Company. For paperboard plates stock of conventional thicknesses i.e., in the range of from about 0.010 to about 0.040 inches, it is preferred that the spacing between the upper die surface and the lower die surface decline continuously from the nominal paperboard thickness at the center to a lower value at the rim.

The paperboard which is formed into the blanks is conventionally produced by a wet laid paper making process and is typically available in the form of a continuous web on a roll. The paperboard stock is preferred to have a basis weight in the range of from about 100 pounds to about 400 pounds per 3000 square foot ream and a thickness or caliper in the range of from about 0.010 to about 0.040 inches as noted above. Lower basis weights and caliper paperboard is preferred for ease of forming and realizing savings in feedstock costs. Paperboard stock utilized for forming paper plates is typically formed from bleached pulp furnish, and is usually impregnated with starch and double clay coated on one side as is further discussed herein.

In a typical forming operation, the web of paperboard stock is fed continuously from a roll through a cutting die to form circular blanks which are then fed into position between the upper and lower die halves. The die halves are heated to aid in the forming process. It has been found that best results are obtained if the upper die half and lower die half—particularly the surfaces thereof—are generally maintained at a temperature in the range of from about 250° F. to about 400° F. These die temperatures have been found to facilitate the plastic deformation of paperboard in the rim areas if the paperboard has the preferred moisture levels. At these preferred die temperatures, the amount of heat applied to the blank is sufficient to liberate the moisture within the blank and thereby facilitate the deformation of the fibers without overheating the blank and causing blisters from liberation of steam or scorching the blank material. It is apparent that the amount of heat applied to the paperboard will vary with the amount of time that the dies dwell in a position pressing the paperboard together. The preferred die temperatures are based on the usual dwell times encountered for normal production speeds of 40 to 60 pressings a minute, and commensurately higher or lower temperatures in the dies would generally be required for higher or lower production speeds, respectively.

Paperboard for disposable pressware typically includes a coating. Illustrative in this regard are U.S. Pat. No. 5,776,619 to Shanton and U.S. Pat. No. 5,603,996 to Overcash et al. The '619 patent discloses plate stock provided with a base coat which includes a styrene-acrylic polymer as well as a clay filler as a base coat as well as a top coat including another styrene acrylic polymer and another clay filler. The use of fillers is common in the art as may be seen in the '996 patent to Overcash et al. In the '996 patent a polyvinyl alcohol polymer is used together with an acrylic emulsion as well as a clay to form a barrier coating for a paperboard oven container. See Column 12, lines 50 and following. Indeed, various coatings for paper form the subject matter of many patents including the following: U.S. Pat. No. 5,981,011 to Overcash et al.; U.S. Pat. No. 5,334,449 to Bergmann et al.; U.S. Pat. No. 5,169,715 to Maubert et al.; U.S. Pat. No. 5,972,167 to Hayasaka et al.; U.S. Pat. No. 5,932,651 to Liles et al.; U.S. Pat. No. 5,869,567 to Fujita et al.; U.S. Pat. No. 5,852,166 to Gruber et al.; U.S. Pat. No. 5,830,548 to Andersen et al.; U.S. Pat. No. 5,795,928 to Janssen et al.; U.S. Pat. No. 5,770,303 to Weinert et al.; U.S. Pat. No. 4,997,682 to Coco; U.S. Pat. No. 4,609,704 to Hausman et al.; U.S. Pat. No. 4,567,099 to Van Gilder et al.; and U.S. Pat. No. 3,963,843 to Hitchmough et al.

Various methods of applying aqueous polymer coatings and smoothing them are known in the art. See U.S. Pat. No. 2,911,320 to Phillips, U.S. Pat. No. 4,078,924 to Keddie et al.; U.S. Pat. No. 4,238,533 to Pujol et al.; U.S. Pat. No. 4,503,096 to Specht; U.S. Pat. No. 4,898,752 to Cavagna et al.; U.S. Pat. No. 5,033,373 to Brendel et al.; U.S. Pat. No. 5,049,420 to Simons; U.S. Pat. No. 5,340,611 to Kustermann et al; U.S. Pat. No. 5,609,686 to Jerry et al, and U.S. Pat. No. 4,948,635 to Iwasaki.

Most typically, die sets for forming paperboard containers include a male or punch die half and a female die half. Typically, the punch half is reciprocally mounted with respect to its opposing die half and both die halves are segmented. One or more portions of the die halves may be spring-biased if so desired, and the particular geometry of the die will depend upon the product desired. In this regard, there is shown in U.S. Pat. No. 4,832,676 to Johns et al. an apparatus for forming a compartmented paperboard plate. The dies illustrated in the '676 patent includes spring-biased segments as well as pressure rings on the punch half. The particular apparatus further includes articulated, full area knockouts.

As will be appreciated by one of skill in the art, the knock-outs are important for separating the finished product from the die halves, particularly during high speed operation. The mechanical features can be further augmented pneumatically as is disclosed in U.S. Pat. No. 4,755,128 to Alexander et al. Other patents of interest include:

U.S. Pat. No. 4,435,143 to Dempsey;
U.S. Pat. No. 5,041,071 to Reasinger et al. and
U.S. Pat. No. 4,778,439 to Alexander.

As will be appreciated from the foregoing patents, mechanical full area punch knock-outs, located in the bottom area of the punch half, commonly are used to aid in the removal of the formed pressware products from the punch by actuating a short distance from the punch contour. The full area punch knock-outs typically separate the product from the punch contour successfully but can create a vacuum between themselves and the formed product resulting in slow and inconsistent release. In the worst cases, the formed product is retained in the die set and it is formed into the following product (double pressed). The double pressed product typically will release from the die set since it has more weight and can more easily break the vacuum. The double press products are scrapped by manufacturing or inadvertently packaged and sold to the consumer. Inconsistent product release from the punch can result in lower forming press productivity, increased product manufacturing cost and reduced useful package count to the customer.

Stated another way, the formed product can remain on or experience slow release from the one piece, full area punch knock-outs due to a vacuum created between its smooth surface contacting the product's smooth coated surface. The suction force created by the vacuum and knock-out surface area (force=pressure (vacuum)×area) may exceed the weight of a paperboard product. The product thus cannot release until air enters between the product and the knock-out or an air eject blow-off system slides the product sideways along the knock-out surface. Either way can result in slow and inconsistent product release.

Mechanical articulated punch knock-outs provide utility by more positively pushing the blank into the die set bottom to provide for full height product formation. This is especially useful in deeper products, such as bowls where heavy paperboard gathering (pleating) can prevent full height product formation. Articulated knock-outs can provide an even better seal/vacuum between the product and the punch knock-out, since they can wrap around into sidewall areas resulting in inconsistent product release and requiring other mechanical means (ie. split punch flange forming) and/or air assist to remove the products.

Removing the product with air can also have unexpected and inconsistent results. Air flowing across light weight pressware products can result in a creation of a "Bernoulli Effect" low pressure lift analogous to that experienced by an airplane wing. The air flowing through the small area between the product and punch can be at high velocity and generate low pressure based on Bernoulli's Principle of conservation of energy. This low pressure can create an upward force that can hold the product against the punch contour and knock-out. Air timing and pressure is critical to remove the products. More air pressure and flow may not provide better release since higher air flow velocities and lift forces can be generated. Just the right amount of air at the correct timing is required to remove the product from the punch, thus resulting in inconsistent results.

The formed pressware products tend to remain on the punch of the die set due to vacuum created between the punch contour, punch knock-out and coated paperboard products particularly. Sudden movement of the punch upwardly after product pressing can also result in the product remaining on the punch due to the vacuum. Improperly cured or tacky surface paperboard coatings can also result in the product sticking to/remaining on the punch half. The various mechanical knock-outs may not be able to remove products with improperly cured/tacky coatings. Corrective action in the coating operation or alternative materials are typically required to improve product removal from the punch half when such coatings are encountered.

SUMMARY OF INVENTION

In one aspect of the present invention, there is provided an improved pressware die set for making paperboard pressware containers having a punch and a die, where the pressware containers have a substantially planar bottom portion, and an outer portion including one or more of a sidewall portion, an outer intermediate portion and a flange portion. The improvement includes a plurality of mechanical product ejectors disposed at the outer portion of the punch forming surface, each of the product ejectors including a movable ejector member with an ejector surface preferably configured to be flush with the adjacent surface of the punch when the die set is in the closed (forming) position and biasing means for stroking the ejector surface away from the adjacent surface of the punch when the die set is in the open position to facilitate removal of formed pressware from the die set. The biasing means may be a spring or the ejectors may include hydraulic, pneumatic, or electronic actuators. In some embodiments, the punch is a segmented punch with a punch base, a punch knock-out and a punch pressure ring where the knock-out and pressure ring reciprocate with respect to the base. The ejectors are advantageously mounted at the pressure ring so that they engage the flange of the product to remove it from the punch. Other suitable locations are such that the ejectors contact the sidewall, intermediate outer portions, or the flange downturn areas at the outermost portion of the formed pressware product. The product ejectors may be reciprocally mounted; however, a rocker-style ejector assembly is preferred wherein its outwardly projecting surfaces are angled inwardly and inclined away from the punch so that the paperboard blank does not encounter a vertical or nearly vertical outwardly projecting surface or an outwardly angled outward surface as it is drawn into the die set. Such surfaces present asperities that may snag and mar the coating or otherwise damage the product during the production process. In a particularly preferred embodiment, the protruding portions of the ejector members (open position) present a smooth and flowing profile toward the adjacent surface of the blank as in the case wherein the outwardly projecting surfaces of the ejector members are streamlined and extend beyond the perimeter of a paperboard blank positioned for forming into a pressware product so that the paperboard blank does not encounter an obstruent outward edge during forming. Preferably, the outwardly projecting surfaces of the ejector assemblies make an angle of at least about 120° with the plane of the punch when stroked away from the forming surface of the punch. An angle at 150° or more is typical.

The punch knock-out may be provided with an upwardly sloping contour at its outer portion (a so-called articulated punch) and the biasing means of the ejector members are typically springs coupled thereto. So also, the die set is typically a heated die set.

The product ejectors typically have a stroke away from the forming surfaces of the punch of at least about 0.125 inches with from about 0.15 to about 0.25 inches preferred. A stroke of about 3/16 inch is preferred in some cases. While at least three product ejectors are suitably employed, four or five or more are preferred. The ejectors have a collective circumferential span of generally less than about 10 percent of the circumference of the punch at its outer portion corresponding to the outer edge of the product and typically less than about 5 percent to minimize potential vacuum with or adherence to the product. Further, the ejector surface is typically provided with a contour to match the forming surfaces of the punch as illustrated in the various Figures.

Preferably, the ejector surface forms a continuous surface with the adjacent forming surfaces of the punch when the punch is in the closed position and the ejectors are spaced apart by at least about 50 or 60 degrees.

A rocker-style ejector assembly for mounting at the outer portion of the die set punch includes an assembly base with a forming surface configured to match a like outer forming surface of the punch, a rocker member pivotally mounted in the assembly base preferably with an ejector surface configured to be flush with the forming surface of the assembly base when the die set is in its closed position and biasing means for urging the ejector surface away from the forming surface of the assembly base so that it projects therefrom when the die set is in the open position to facilitate the removal of formed product. The assembly is advantageously mounted on the pressure ring of a segmented punch with the pivot pin at the outermost part of the assembly near the outer edge of the pressure ring. Both the rocker member and the assembly base may be provided with an outer flange-forming contour portion which is downwardly concave away from the punch surface.

There is still further provided in accordance with the invention a method of making a pressed paperboard container including the steps of positioning a paperboard blank in an open presswsare die set provided with the inventive product ejectors, closing the die set to form the container and opening the die set whereupon the ejector surfaces are urged away from the forming surfaces of the punch to eject a formed container. The paperboard is preferably provided with a substantially liquid-impervious coating including an organic pigment or filler and a water-based, press-applied overcoat. The paperboard is typically impregnated with starch, and may be laminated with a polymeric layer if so desired. The paperboard blank is preferably a scored paperboard blank, and may be coated with a carboxylated styrene-butadiene polymer in some cases.

The scores of the blank typically extend from its outer regions inwardly to facilitate the formation of densified regions in the formed product. Typically, the densified regions are circumferentially spaced, formed from a plurality of paperboard layers reformed into substantially integrated fibrous structures generally inseparable into their constituent layers and have a thickness generally equal to adjacent areas of the container. They extend radially inwardly from the flange of the formed product through a transition region to the sidewall and along the sidewall to near the central portion of the container. The densified regions typically extend along a profile distance corresponding to at least a portion of the length of the scores of the paperboard blank from which the container was formed.

Any suitable caliper of paperboard may be used. Generally, the paperboard has a caliper of at least about 10 mils (thousandths of an inch) and typically has a caliper of at least 12 mils. Thicknesses of from about 10 to about 25 mils are typical as are coatings including a clay filler. Preferred products have a caliper of 15 mils or more in some embodiments, while calipers of from about 12 to about 22.5 mils are typical.

BRIEF DESCRIPTION OF DRAWINGS

The invention is described in detail below with reference to the Figures wherein like numerals designate similar parts. In the Figures:

FIG. 9 is a view in perspective of another alternate configuration of a product ejector assembly mounted in a pressure ring of the punch assembly of a pressware die set;

DETAILED DESCRIPTION

Figure 1:
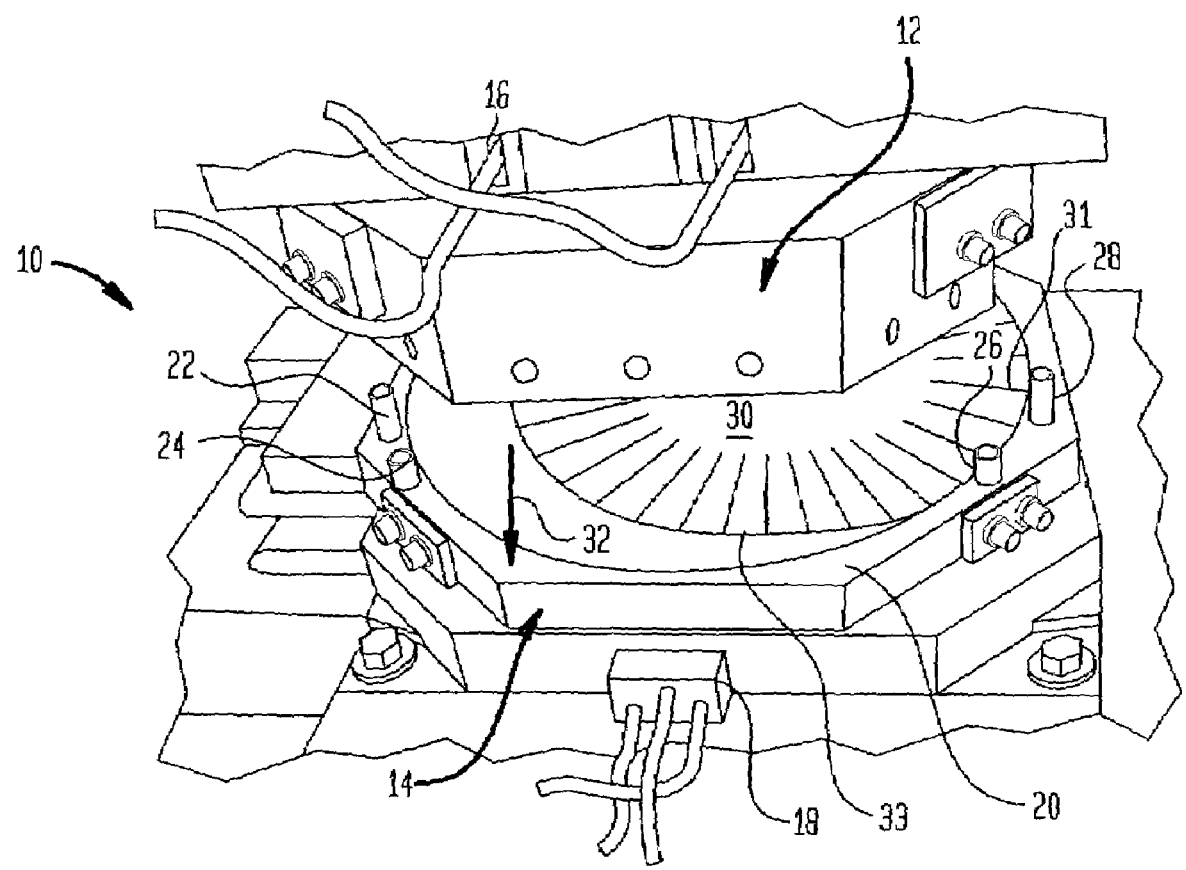
FIG. 1 is a view in perspective of a heated matched metal pressware die set.

The invention is described in detail below in connection with several embodiments illustrated in the drawings. Such description and exemplification is for purposes of illustration only and is not intended to limit the invention in any way. Modification to particular embodiments within the spirit and scope of the present invention, set forth in the appended claims, will be readily apparent to those of skill in the art.

The present invention is generally directed to an improved pressware die set of the class used to make disposable paperboard pressware containers such as plates, bowls, platters and the like. A typical container may have a generally round shape, is press-formed from a generally planar paperboard blank and may include: a generally planar bottom portion; a first annular transition portion extending upwardly and outwardly from the generally planar bottom portion; a sidewall portion extending upwardly and outwardly from the first annular transition portion; a second annular transition portion extending outwardly from the sidewall portion; and an outer flange portion extending outwardly with respect to the second annular transition portion defining a generally circular container perimeter. The sidewall portion, the second annular transition portion and the flange are optionally provided with a plurality of circumferentially spaced, radially extending densified regions preferably formed from a plurality of paperboard layers reformed into substantially integrated fibrous structures generally inseparable into their constituent layers having a thickness generally equal to adjacent areas of the disposable container. The paperboard container may have any suitable configuration, typically including outer sidewall, flange and intermediate regions. Preferably, the container is prepared from a radially scored paperboard blank wherein the densified regions extend over a profile distance corresponding to at least a portion of the length of the scores of the paperboard blank from which the container is formed. A preferred embodiment is in the form of a disposable plate having a caliper of at least about 10 mils, and typically having a caliper of at least about 12 mils, or 15 mils in some cases.

In some cases, the container has a caliper of at least about 15 mils and being provided with a coating comprising a clay filler. Generally a caliper range of from about 10 to about 25 mils is employed in connection with paperboard containers with from about 12 to about 22.5 mils being typical.

Clay coated paperboard is typically printed, coated with a functional grease/water resistant barrier and moistened prior to blanking and forming. The printed, coated and moistened paperboard roll is then transferred to a web feed blanking press where the blanks with tabs are cut in a straight across, staggered, or nested pattern (to minimize scrap). The blanks are transferred to the multi-up forming tool via individual transfer chutes. Instead of web forming, blanks could be rotary cut or reciprocally cut off-line in a separate operation. The blanks could be transferred to the forming tooling via transfer chutes using a blank feed style press. The overall productivity of a blank feed style press is typically lower than a web feed style press since the stacks of blanks must be continually inserted into the feed section, the presses are commonly narrow in width with fewer forming positions available and the forming speeds are commonly less since fluid hydraulics are typically used versus mechanical cams and gears.

The blank may be positioned in the die set by rigid or rotating pin stops as well as by side edge guides that contact the blank diameter. The punch pressure ring may contact the blank, clamping it against the lower draw ring relief area to provide initial pleating control. The upper punch and lower die knock-outs (that may have compartment ribs machined into them) may then contact the paperboard holding the blank on center and preform the compartmented dividers. The upper knock-out may be of an articulated style having spring pre-load and full loads and 0.030 inch to 0.120 inch articulation stroke during the formation. The pressure ring can have the outer product profile machined into it and optionally provides further pleating control by clamping the blank between its profile area and die outer profile during the formation. The draw ring and pressure rings springs may be chosen in a manner to allow full movement of the draw ring prior to pressure ring movement (i.e., full spring force of draw ring is less than or equal to the pre-load of the pressure ring springs). An articulated punch knock-out promotes formation of the inner (bottom) parts of the container prior to final formation of the sidewall, flange and downturn areas.

The following patent applications contain further information as to materials, processing techniques and equipment and are incorporated by reference: U.S. application Ser. No. 10/600,814, filed Jun. 20, 2003, entitled "Disposable Servingware Containers With Flange Tabs"; U.S. Pat. No. 6,715,630, entitled "Disposable Food Container With A Linear Sidewall Profile and an Arcuate Outer Flange"; U.S. Pat. No. 6,733,852, entitled "Disposable Serving Plate With Sidewall-Engaged Sealing Cover", U.S. Pat. No. 6,474,497, entitled "Smooth Profiled Food Service Articles"; U.S. Pat. No. 6,893,693, entitled "High Gloss Disposable Pressware" U.S. application Ser. No. 09/978,484, filed Oct. 17, 2001, entitled "Deep Dish Disposable Pressed Paperboard Container"; U.S. Pat. No. 6,585,506, entitled "Side Mounted Temperature Probe for Pressware Die Sets"; U.S. Pat. No. 6,592,357, entitled "Rotating Inertial Pin Blank Stops for Pressware Die Sets"; and U.S. Pat. No. 6,589,043, entitled "Punch Stripper Ring Knock-Out for Pressware Die Sets". See also, U.S. Pat. Nos. 5,249,946; 4,832,676; 4,721,500; and 4,609,140, which are particularly pertinent.

The ejectors of the invention are advantageously used in a heated matched pressware die set utilizing inertial rotating pin blank stops as described in copending application U.S. Ser. No. 09/653,577, filed Aug. 31, 2000. For paperboard plate stock of conventional thicknesses in the range of from about 0.010 to about 0.040 inches, the springs upon which the lower die half is mounted are typically constructed such that the full stroke of the upper die results in a force applied between the dies of from about 6000 to 8000 pounds. Similar forming pressures and control thereof may likewise be accomplished using hydraulics as will be appreciated by one of skill in the art. The paperboard which is formed into the blanks is conventionally produced by a wet laid paper making process and is typically available in the form of a continuous web on a roll. The paperboard stock is preferred to have a basis weight in the range of from about 100 pounds to about 400 pounds per 3000 square foot ream and a thickness or caliper in the range of from about 0.010 to about 0.040 inches as noted above. Lower basis weight paperboard is preferred for ease of forming and to save on feedstock costs. Paperboard stock utilized for forming paper plates is typically formed from bleached pulp furnish, and is usually double clay coated on one side. Such paperboard stock commonly has a moisture (water content) varying from about 4.0 to about 8.0 percent by weight.

The effect of the compressive forces at the rim is greatest when the proper moisture conditions are maintained within the paperboard: at least 8% and less than 12% water by weight, and preferably 9.0 to 10.5%. Paperboard having moisture in this range has sufficient moisture to deform under pressure, but not such excessive moisture that water vapor interferes with the forming operation or that the paperboard is too weak to withstand the high compressive forces applied. To achieve the desired moisture levels within the paperboard stock as it comes off the roll, the paperboard is treated by spraying or rolling on a moistening solution, primarily water, although other components such as lubricants may be added. The moisture content may be monitored with an infra-red device as is well known. It is preferred that the plate stock not be formed for at least six hours after moistening to allow the moisture within the paperboard to reach equilibrium.

Because of the intended end use of the products, the paperboard stock is typically impregnated with starch and coated on one side with a liquid proof layer or layers comprising a press-applied, water-based coating applied over the inorganic pigment typically applied to the board during manufacturing. In addition, for esthetic reasons, the paperboard stock is often initially printed before being coated with an overcoat layer. As an example of typical coating material, a first layer of latex coating may be applied over the printed paperboard with a second layer of acrylic coating applied over the first layer. These coatings may be applied either using the conventional printing press used to apply the decorative printing or may be applied using some other form of a conventional press coater. Preferred coatings utilized in connection with the invention may include 2 pigment (clay) containing layers, with a binder, of 3 lbs/3000 ft$^2$ ream or so followed by 2 acrylic layers of about 0.5–1 lbs/3000 ft$^2$ ream. The layers are applied by press coating methods, i.e., gravure, coil coating, flexographic methods and so forth as opposed to extrusion or film laminating methods which are expensive and may require off-line processing as well as large amounts of coating material. An extruded film, for example, may require 25 lbs/3000 ft$^2$ ream.

Carboxylated styrene-butadiene resins may be used with or without filler if so desired.

A layer comprising a latex may contain any suitable latex known to the art. By way of example, suitable latexes include styrene-acrylic copolymer, acrylonitrile styrene-acrylic copolymer, polyvinyl alcohol polymer, acrylic acid polymer, ethylene vinyl alcohol copolymer, ethylene-vinyl chloride copolymer, ethylene vinyl acetate copolymer, vinyl acetate acrylic copolymer, styrene-butadiene copolymer and acetate ethylene copolymer. Preferably, the layer comprising a latex contains styrene-acrylic copolymer, styrene-butadiene copolymer, or vinyl acetate-acrylic copolymer. More preferably, the layer comprising a latex contains vinyl acetate ethylene copolymer. A commercially available vinyl acetate ethylene copolymer is "AIRFLEX® 100 HS" latex. ("AIRFLEX® 100 HS" is a registered trademark of Air Products and Chemicals, Inc.) Preferably, the layer comprising a latex contains a latex that is pigmented. Pigmenting the latex increases the coat weight of the layer comprising a latex thus reducing runnability problems when using blade cutters to coat the substrate. Pigmenting the latex also improves the resulting quality of print that may be applied to the coated paperboard. Suitable pigments or fillers include kaolin clay, delaminated clays, structured clays, calcined clays, alumina, silica, aluminosilicates, talc, calcium sulfate, ground calcium carbonates, and precipitated calcium carbonates. Other suitable pigments are disclosed, for example, in *Kirk-Othmer, Encyclopedia of Chemical Technology*, Third Edition, Vol. 17, pp. 798, 799, 815, 831–836. Preferably the pigment is selected from the group consisting of kaolin clay and conventional delaminated coating clay. An available delaminated coating clay is "HYDRAPRINT" slurry, supplied as a dispersion with a slurry solids content of about 68%. "HYDRAPRINT" slurry is a trademark of Huber. The layer comprising a latex may also contain other additives that are well known in the art to enhance the properties of coated paperboard. By way of example, suitable additives include dispersants, lubricants, defoamers, film-formers, antifoamers and crosslinkers. By way of example, "DISPEX N-40" is one suitable organic dispersant and comprises a 40% solids dispersion of sodium polycarboxylate. "DISPEX N-40" is a trademark of Allied Colloids. By way of example, "BERCHEM 4095" is one suitable lubricant and comprises 100% active coating lubricant based on modified glycerides. "BERCHEM 4095" is a trademark of Bercap. By way of example, "Foamaster DF-177NS" is one suitable defoamer. "Foamaster DF-122 NS" is a trademark of Henkel. In a preferred embodiment, the coating comprises multiple layers that each comprise a latex.

The stock is moistened on the uncoated side after all of the printing and coating steps have been completed. In a typical forming operation, the web of paperboard stock is fed continuously from a roll through a scoring and cutting die to form the blanks which are scored and cut before being fed into position between the upper and lower die halves. The die halves are heated as described above, to aid in the forming process. It has been found that best results are obtained if the upper die half and lower die half—particularly the surfaces thereof—are maintained at a temperature in the range of from about 250° F. to about 400° F., and most preferably at about 325° F.±25° F. These die temperatures have been found to facilitate the plastic deformation of paperboard in the rim areas if the paperboard has the preferred moisture levels. At these preferred die temperatures, the amount of heat applied to the blank is sufficient to liberate the moisture within the blank and thereby facilitate the deformation of the fibers without overheating the blank and causing blisters from liberation of steam or scorching the blank material. It is apparent that the amount of heat applied to the paperboard will vary with the amount of time that the dies dwell in a position pressing the paperboard together. The preferred die temperatures are based on the usual dwell times encountered for normal production speeds of 30 to 60 pressings a minute, and commensurately higher or lower temperatures in the dies would generally be required for higher or lower production speeds, respectively. A die set wherein the upper assembly includes a segmented punch member and is also provided with a contoured upper pressure ring is advantageously employed in connection with the present invention. Pleating control is typically achieved by lightly clamping the paperboard blank about a substantial portion of its outer portion as the blank is pulled into the die set and the pleats are formed.

There is shown generally in FIG. 1 a heated matched metal die set 10 including a punch assembly 12 and a die assembly 14. Assemblies 12 and 14 typically include heaters and sensors indicated at 16, 18 as is known in the art and are mounted to reciprocate with respect to one another. In FIG. 1, die assembly 14 includes a draw ring 20 provided with rotating pin blank stops 22, 24, 26, 28 and there is shown a scored paperboard blank 30 with scores 31 of generally planar configuration being positioned for forming as it moves along a production direction indicated by arrow 32. Once positioned for forming, the perimeter 33 of paperboard blank 30 is inside of the outermost edge 37 of the pressure ring, or corresponding edge 37' of the ejector assembly bases as discussed hereinafter.

Figure 4:
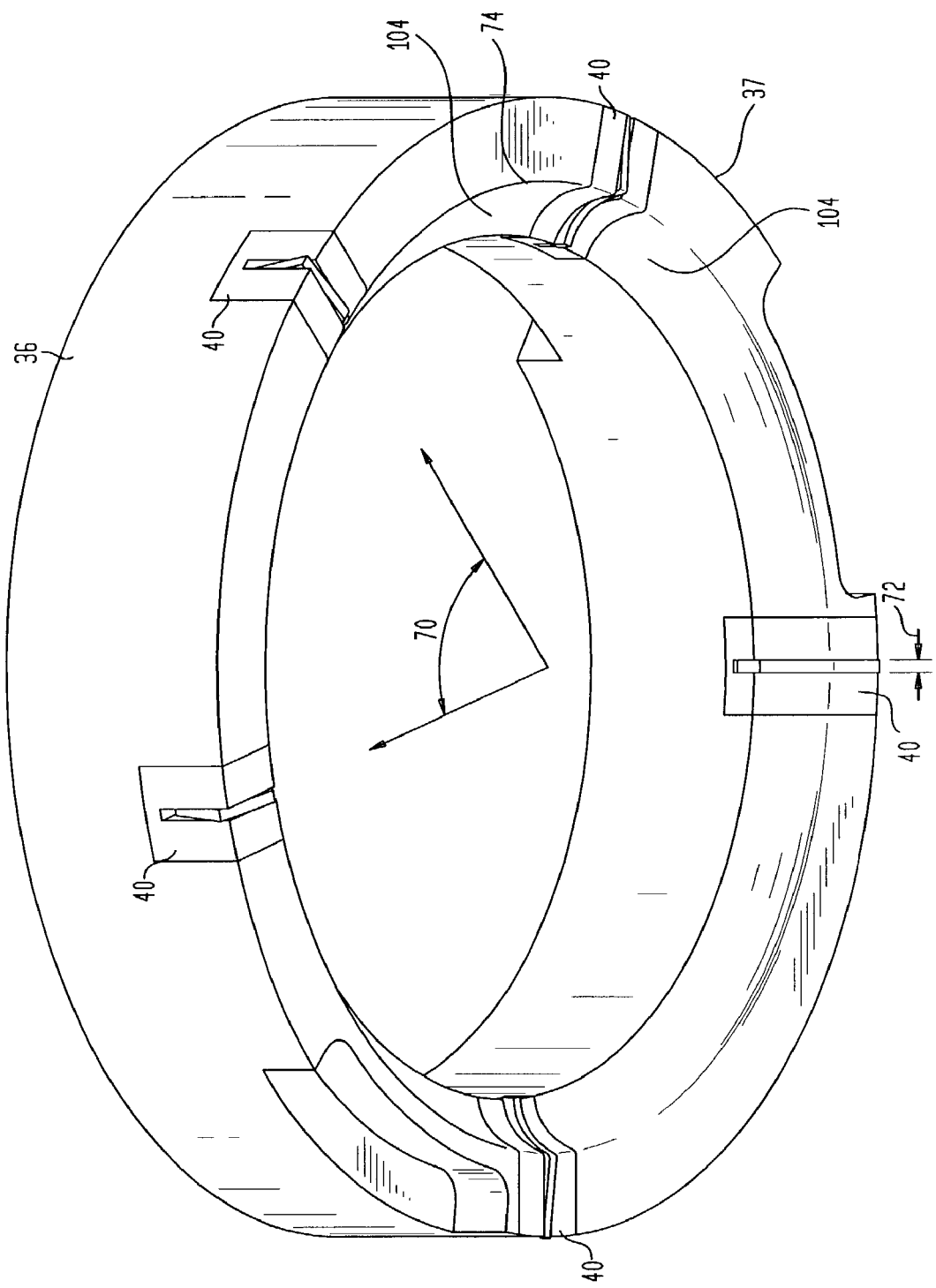
FIG. 4 is a perspective view of a pressure ring of a matched metal heated pressware die set provided with five ejector assemblies of the type shown in FIGS. 2 and 3 about its circumference.

Assembly 12 includes a forming punch 34 with a pressure ring 36 mounted in opposed relationship to draw ring 20 as is shown schematically in FIGS. 4, 5 and 6, discussed in more detail hereinafter.

Figure 2:
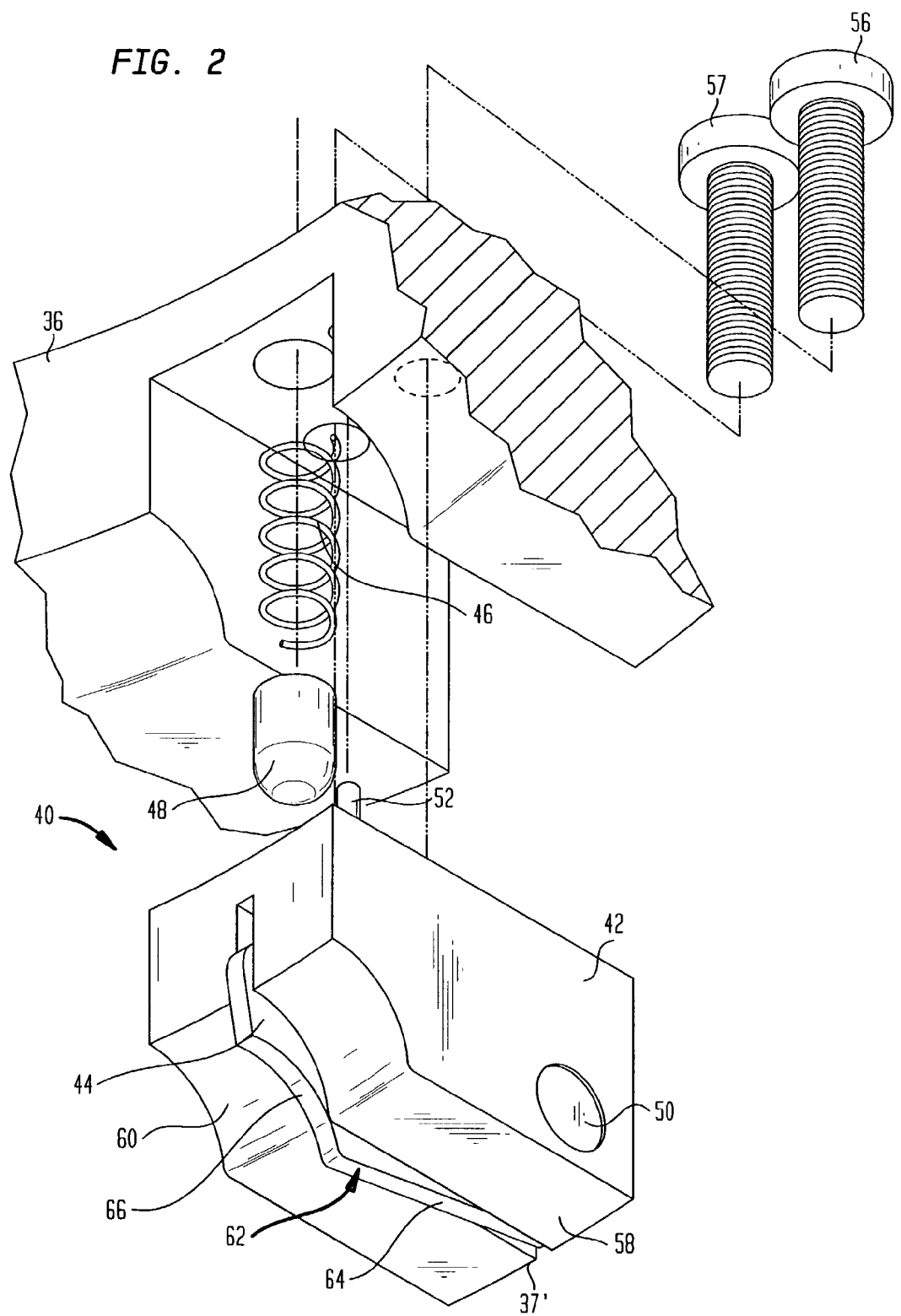
FIG. 2 is an exploded view of a preferred spring-biased ejector assembly of the present invention for mounting at the outer periphery of a punch portion of a die set wherein the ejector is in the form of a rocker member having a surface configured to be flush with the surface of a pressure ring when the die set is closed.
Figure 3:
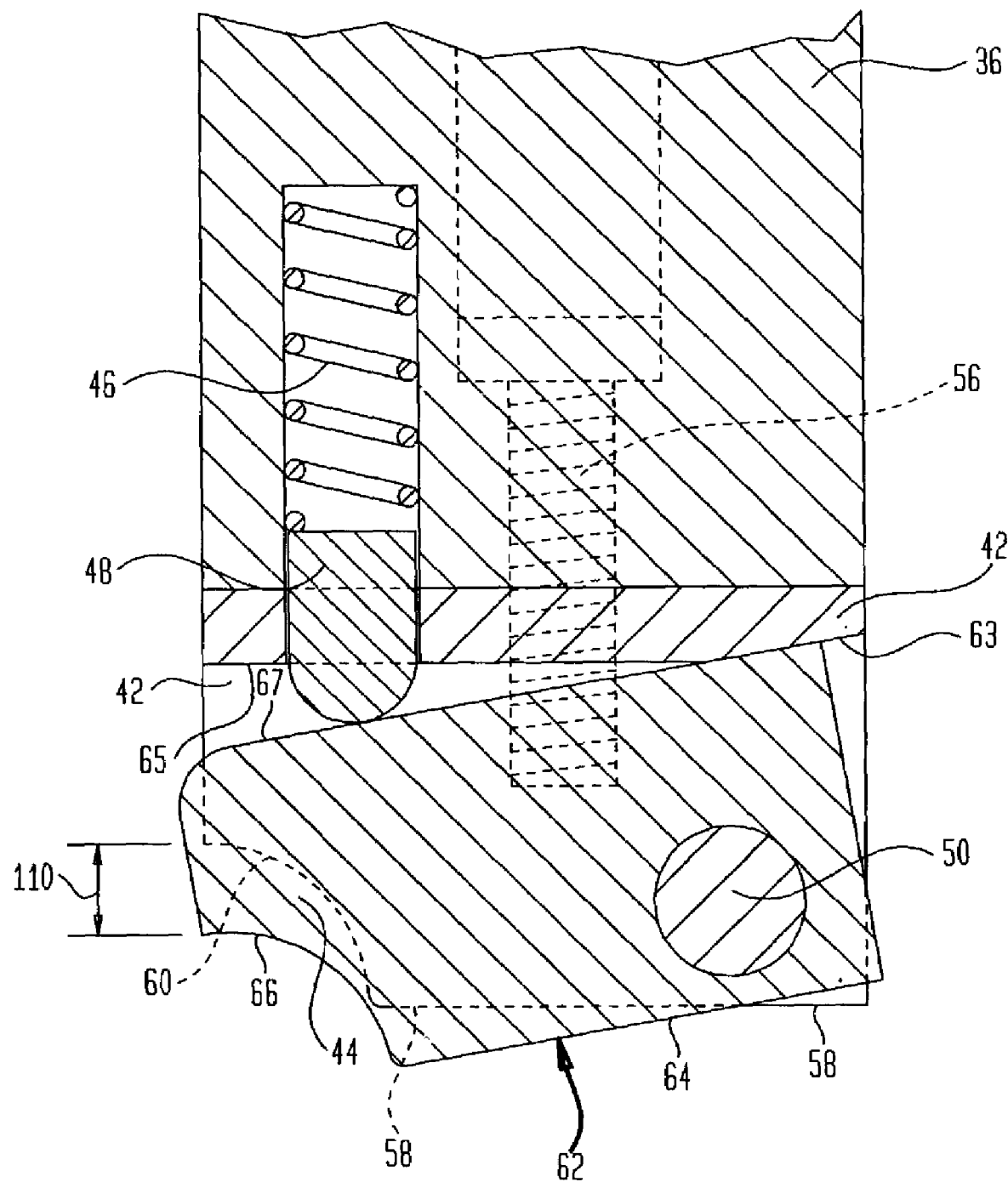
FIG. 3 is a view in elevation and section of the ejector assembly of FIG. 2.

FIGS. 2 and 3 illustrate a preferred embodiment of a product ejector assembly 40, a plurality of which are mounted on pressure ring 36. Assembly 40 includes a base 42, a rocker member 44, a spring 46, a pressure member 48, a pivot pin 50 for pivotally securing rocker member 44 in the base and a locating pin 52 to locate and help secure the assembly in pressure ring 36 which cooperates with bolts 56, 57 to hold assembly 40 in place.

Base 42 has an outer surface 58 for receiving paperboard blank 30 as well as a contour surface 60 for forming the flange of the pressure product. Ejector member 44 is provided with an ejector surface 62 which has an outer surface 64 and an inner contour surface 66 which are matched with surfaces 58 and 60 of base 42. Base 42 has an outer stop surface 63 as well as an inner stop surface 65 which limit rotation of member 44. In the forming position, spring 46 is compressed and upper surface 67 of member 44 is in contact with surface 65 so that the forming surface of the rocker member is under full forming pressure of the die set. In the open position of the die set, surface 67 of member 44 contacts stop surface 63 as will be appreciated from FIGS. 3, 5A and the discussion which follows.

Operation of ejector 40 is illustrated in connection with FIGS. 3 through 6A. FIG. 4 is a view in perspective of pressure ring 36 provided with five ejector assemblies 40 spaced around the circumference of the pressure ring, separated by angle 70 of typically at least about 50° or so. Members 44 have a small lateral dimension 72 such that their collective circumferential span (5×72 in this case) is less than 10 percent of the circumference of the forming surface of the punch, the circumference in this case being taken at the outer edge of the forming surface of the pressure ring at 74 for example which corresponds approximately to the circumference of the product at its outer edge shown in FIG. 7. The collective circumferential span of the ejector surfaces is kept small to reduce possible vacuum formation with the product, or sticking with a tacky coating on the pressware product being formed; typically, one may employ embodiments where the collective circumferential span of the ejector surfaces is from about 2–4 percent of the circumference of the pressed product at its outer edge.

Figure 5:
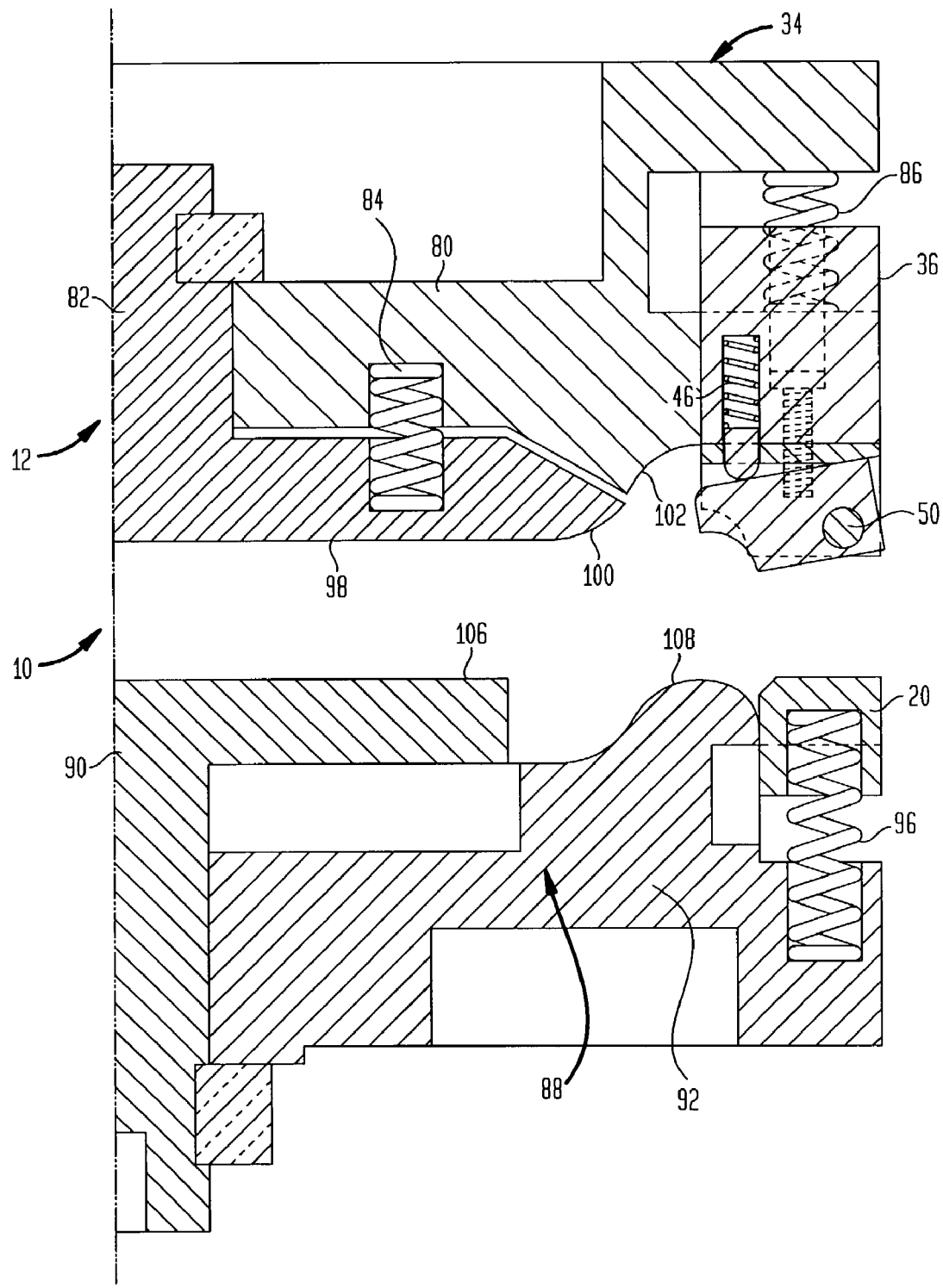
FIG. 5 is a partial schematic view in elevation of a matched metal pressware die set showing the die set in an open position wherein a pressure ring is provided with ejector assemblies of the type shown in FIGS. 2, 3 and 4.
Figure 6:
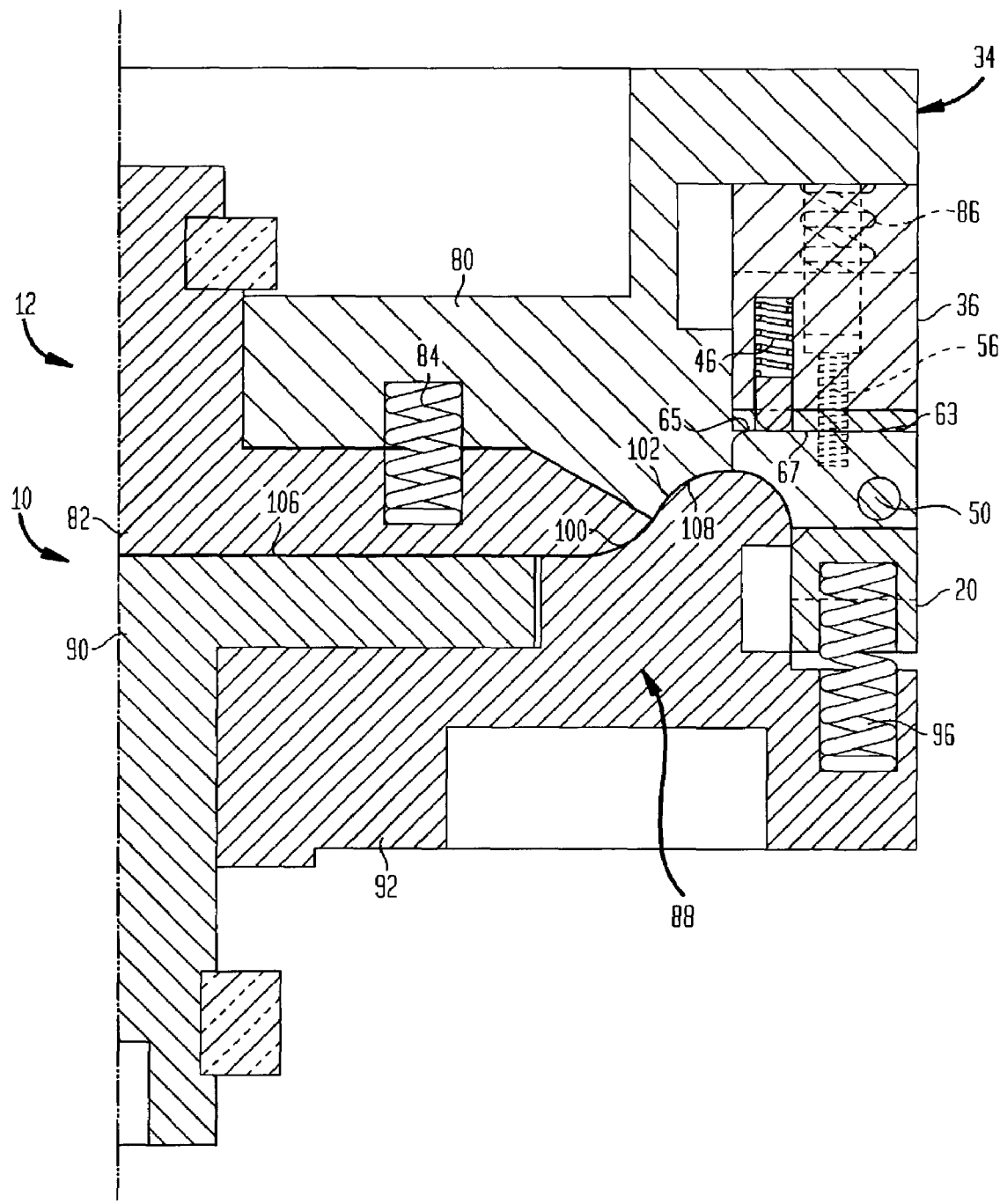
FIG. 6 is a partial schematic view in elevation of a matched metal pressware die set in a closed (forming) position wherein the pressure ring is provided with ejector assemblies of the type shown in FIGS. 2, 3 and 4.
Figure 6A:
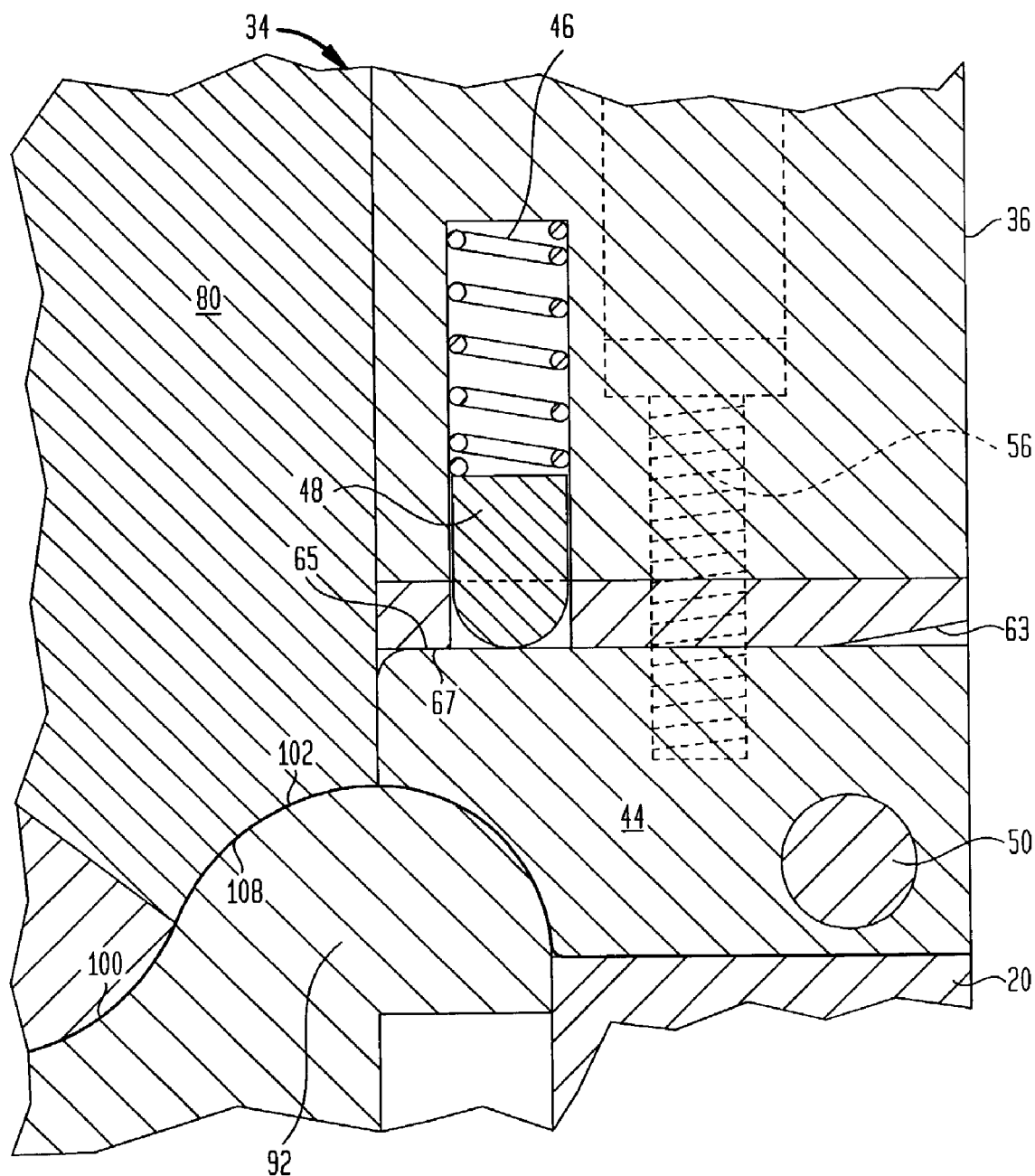
FIG. 6A is an enlarged detail of the die set of FIG. 6 showing the ejector retracted flush with the adjacent pressure ring surface.

A typical die set is shown in schematic profile in FIGS. 5 and 6; wherein FIG. 5 die set 10 is illustrated in the open position for receiving a paperboard blank and ejecting formed product and in FIG. 6 the die set is shown in the closed or product-forming position. Punch assembly 12 includes a male half or punch 34 with a punch base 80, a punch knock-out 82, as well as pressure ring 36 and associated springs 84, 86. The punch is thus a segmented punch and is matched with a die 88 which includes a die knock-out 90, a die base 92, draw ring 20, as well as springs, such as spring 96.

Punch knock-out 82 has a substantially planar central portion 98 as well as a contour portion 100 for forming an inner transition portion of the product. Knock-out 82 is thus termed an articulated knock-out due to this contour; although any suitable punch configuration may be used in connection with the invention. Punch base 80 has a forming surface 102 likewise provided with a contour corresponding to the sidewall and outer transition portion of a formed product while pressure ring 36 has another contour surface 104 (FIG. 4) corresponding to the flange of a formed pressware product, of like configuration with surface 66 of rocker member 44.

Knock-out 90 of die 88 has a substantially planar surface 106 corresponding to surface 98 of knock-out 82, while punch base 92 has a full contour surface 108 corresponding to surfaces 100, 102 and 104 of punch 34. Surface 108 also matches surface 66 of rocker member 44 as shown.

Pressware die set 10 shown in FIGS. 1 through 6A generally operates as follows. A paperboard blank 30 is disposed on the female half, or die of the die set, as shown in FIG. 1, while the die set is in the open position shown schematically in FIG. 5. Punch 34 advances toward die 88 such that pressure ring 36 and draw ring 20 contact the blank, holding it in position while knock-outs 82 and 90 are moved into proximity with the blank. In the early stages the contour surfaces such as surfaces 100, 102, 104 and 108 have not yet begun to form the outer periphery of the containers. The die set next continues to close toward the fully closed forming position shown in FIG. 6, with knock-out 82 and die knock-out 90 pre-forming the central portion of the container, while pressure ring 36 begins to form the flange of the container at the intermediate stages. At more advanced stages of formation, the contour surfaces of the die and punch form the outer contour of the container with the die set eventually assuming the fully closed position as shown schematically in FIG. 6 to produce the product shown in FIG. 7.

The die set is then returned to the open position shown in FIG. 5 and the formed product is removed. The improved die set of the invention facilitates the removal process by providing ejector surfaces such as surface 66 which strokes away from surface 104 of pressure ring 36 a stroke distance 110 at a plurality of spaced locations, under the influence of biasing springs such as spring 46. Of course, pneumatic, hydraulic or electronic actuators may be used if so desired. During formation, surface 66 of member 44 most preferably forms a continuous surface flush with the adjacent forming surfaces as will be appreciated from the various diagrams.

Figure 5A:
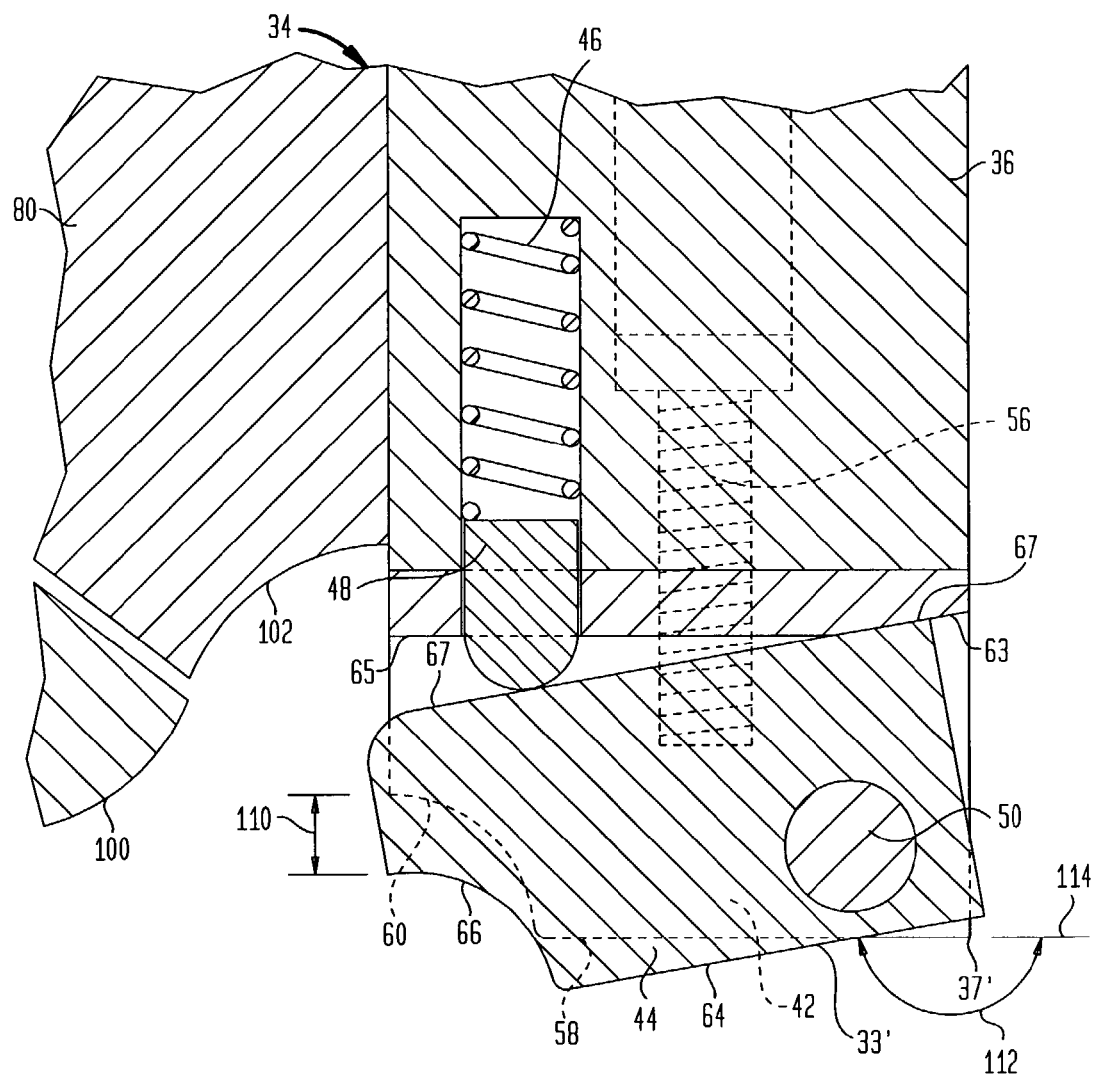
FIG. 5A is an enlarged detail of the die set of FIG. 5 showing the ejector stroked downwardly.

It is likewise preferred that the outwardly projecting surfaces of the ejector members, such as surface 64, forms an angle indicated at 112 in FIG. 5A of greater than 90° with the plane of the punch indicated at 114 so that the ejector will not snag or mar the product as the paperboard blank is drawn into the die set during formation. That is, outward surfaces orthogonal to the plane of the punch or outward surfaces angled outwardly are to be avoided when the paperboard blank is being drawn into the die set. Preferably, surface 64 of member 44 extends beyond the perimeter 33 of a paperboard blank indicated schematically at 33' in FIG. 5A to the outer edge 37' of the ejector base, well beyond the forming surfaces. Note that pin 50 is likewise in proximity to the outer edge of the punch.

In preferred embodiments, draw and/or pressure rings may include one or more of the features: circular or other shape designed to match product shape; external location with respect to the forming die or punch base and die or base contour; stops (rigid or rotating) connected thereto to locate blank prior to formation; cut-out "relief" area that is approximately the same depth as the paperboard caliper and slightly larger than the blank diameter to provide a reduced clamp force before pleating starts to occur and may extend with clearance into the tab areas to reduce clamp force during draw-in of the tabs; this provides initial pleating control before arcuate outer area contacts and provides final pleating control; relief areas may be desirable in the tab areas of the blank to reduce tension and stretch that may damage coating during formation; 3 to 4 L-shaped brackets each (stops) are bolted into both the draw and pressure rings around their perimeters and contact milled-out areas in the respective die and punch forming bases or contours to provide the springs with preload distances and forces; typical metal for the draw ring is steel, preferably AISI 1018, typical surface finishes of 125 rms are standard for the draw ring, 63 rms are desired for the horizontal top surface, and inner diameter; a 32 rms finish is desired on the horizontal relief surface; pins and bushings are optionally added to the draw and pressure rings and die and punch bases to minimize rotation of the rings; inner diameter of the pressure ring may be located relatively inwardly at a position generally corresponding to the outer part of the second annular transition of the container or relatively outwardly at a position generally corresponding to the inner part of the arcuate outer flange or at a suitable location therebetween; the draw and pressure ring inner diameters should be slightly larger than the matching bases/contours such as to provide for free movement, but not to allow significant misalignments due to loose tolerencing; 0.005" to 0.010" clearance per side (0.010" to 0.020" across the diameter) is typical; 4 to 8 compression springs each per draw ring and pressure ring typically are used to provide a preload and full load force under pre and full deflections; machined clearance holes for the springs should be chamfered to ensure no binding of the springs during the deflection; the spring diameters, free lengths, manufacturer and spring style can be chosen as desired to obtain the desired draw ring and pressure ring preloads, full load and resulting movements and clamping action; to obtain the desired clamping action the preload of the pressure ring springs (total force) should be slightly greater than the fully compressed load of the draw ring springs (total force); the preload of the draw ring springs should be chosen to provide adequate pleating control while not clamping excessively hard on the blank while in the draw ring relief; for example, (6) draw ring compression springs LC-059G-11 SS (0.48" outside diameter, 0.059" wire diameter, 2.25" free length, spring rate 18 lb/in×0.833 (for stainless steel)=14.99 lb/in, and a solid height of 0.915"); a 0.375" preload on each spring provides a total preload force of (6)×14.99 lb/in×0.375"=33.7 lbs; an additional deflection of the springs of 0.346" or (0.721" total spring deflection) results in a total full load force of (6)× 14.99 lb/in×0.721"=64.8 lbs; (6) pressure ring compression springs LC-080J-10 SS (0.75" outside diameter, 0.080" wire diameter, 3.00" free length, spring rate of 20.23 lb/in×0.833 (for stainless steel)=16.85 lb/in, and a solid height of 1.095"; a 0.835" preload on each spring provides a total preload force of (6)×16.85 lb/in×0.835"=84.4 lbs (greater than draw ring full deflection spring load total force); an additional deflection of the springs of 0.46" (1.295" total spring deflection) results in a total full load force of (6)×16.85 lb/in× 1.295"=130.9 lbs; or for example, (4) draw ring compression springs LC-067H-7 SS (0.60" outside diameter, 0.067" wire diameter, 1.75" free length, spring rate 24 lb/in×0.833 (for stainless steel)=19.99 lb/in, and a solid height of 0.705"); a 0.500" preload on each spring provides a total preload force of (4)×19.99 lb/in×0.500"=40.0 lbs; an additional deflection of the springs of 0.40" or (0.90" total spring deflection) results in a total full load force of (4)×19.99 lb/in× 0.90"=72.0 lbs; (8) pressure ring compression springs LC-049E-18 SS (0.36" outside diameter, 0.049" wire diameter, 2.75" free length, spring rate of 14 lb/in×0.833 (for stainless steel)=11.66 lb/in, and a solid height of 1.139"; a 1.00" preload on each spring provides a total preload force of (8)×11.66 lb/in×1.00"=93.3 lbs (greater than draw ring fully deflection spring load total force); an additional deflection of the springs of 0.50" (1.500" total spring deflection) results in a total full load force of (8)×11.66 lb/in× 1.500"=140 lbs. The springs referred to above are available from Lee Spring Co. Many other suitable components may of course be employed when making the inventive containers from paperboard.

Figure 7:
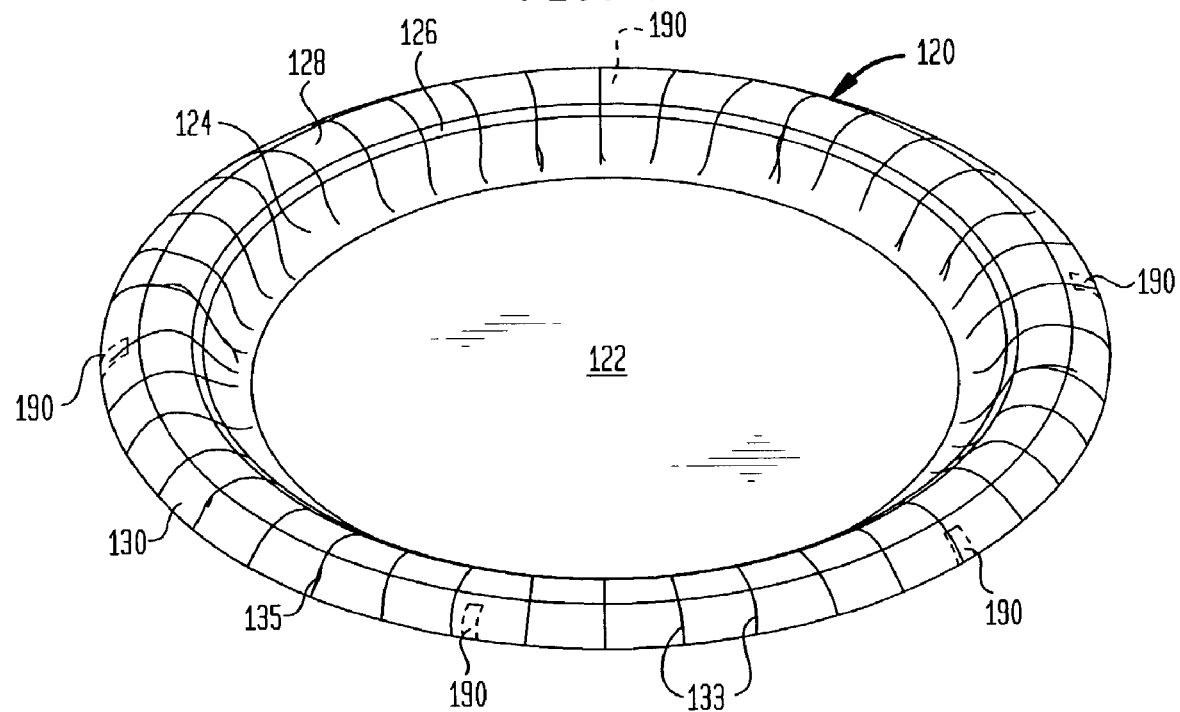
FIG. 7 is a perspective view of a pleated disposable plate press-formed from a paperboard blank in the die set of FIGS. 1–6A.

A typical product formed with the improved die set of the invention is a paper plate 120 shown in FIG. 7 provided with a substantially planar central portion 122, an inner transition portion 124, a sidewall portion 126, an outer transition portion 128 and a flange portion 130. There are further provided a plurality of pleats such as pleats 133, 135 as shown. Preferably, the pleats correspond to scores such as scores 31 in paperboard blank 30 from which plate 120 is prepared. The pleats include a plurality of paperboard layers reformed into a substantially integrated fibrous structure along the score lines during the forming process described above.

Figure 8:
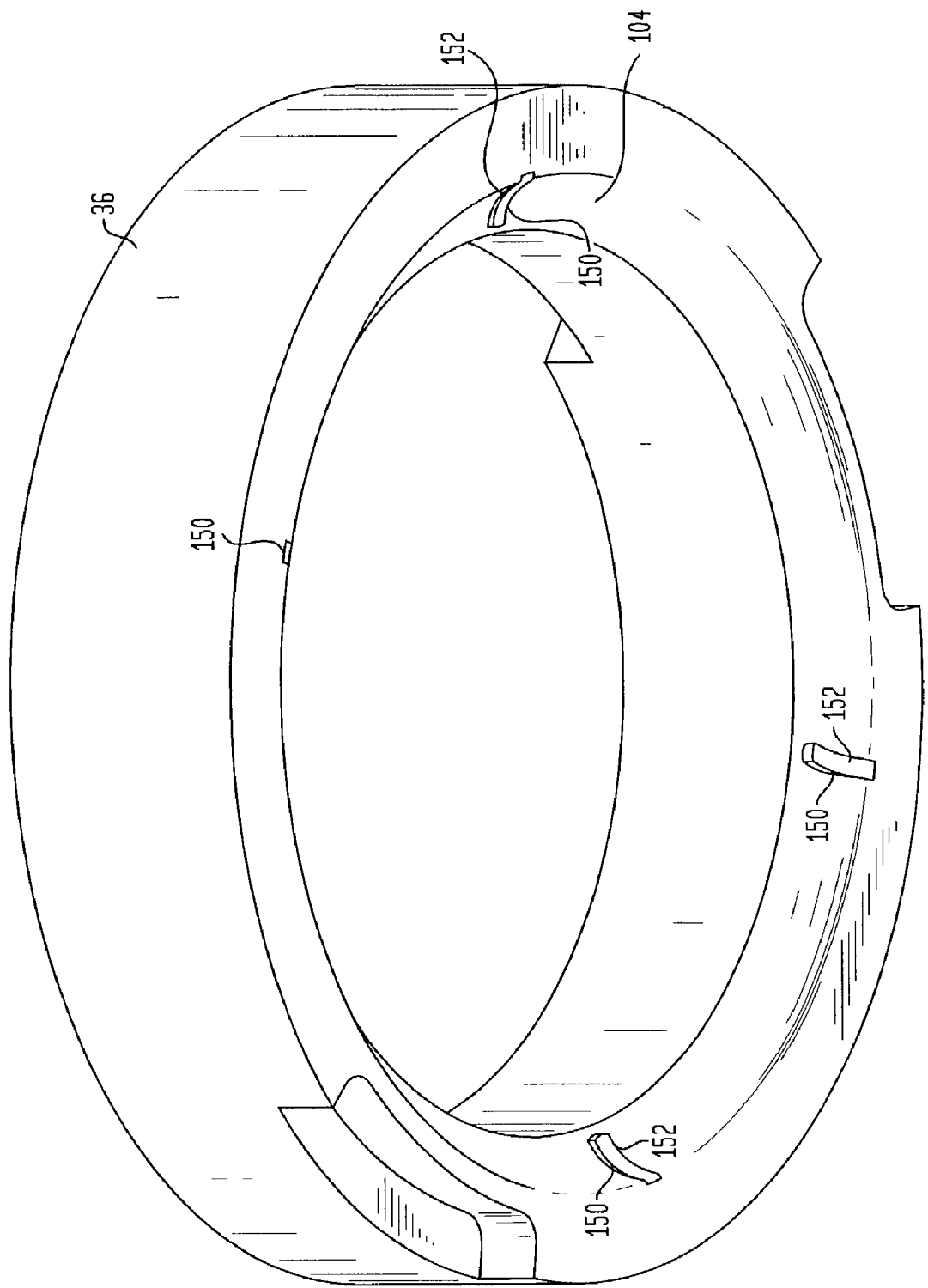
FIG. 8 is a view in perspective of an alternate configuration of a product ejector assembly mounted in a pressure ring of the punch assembly of a pressware die set.
Figure 8A:
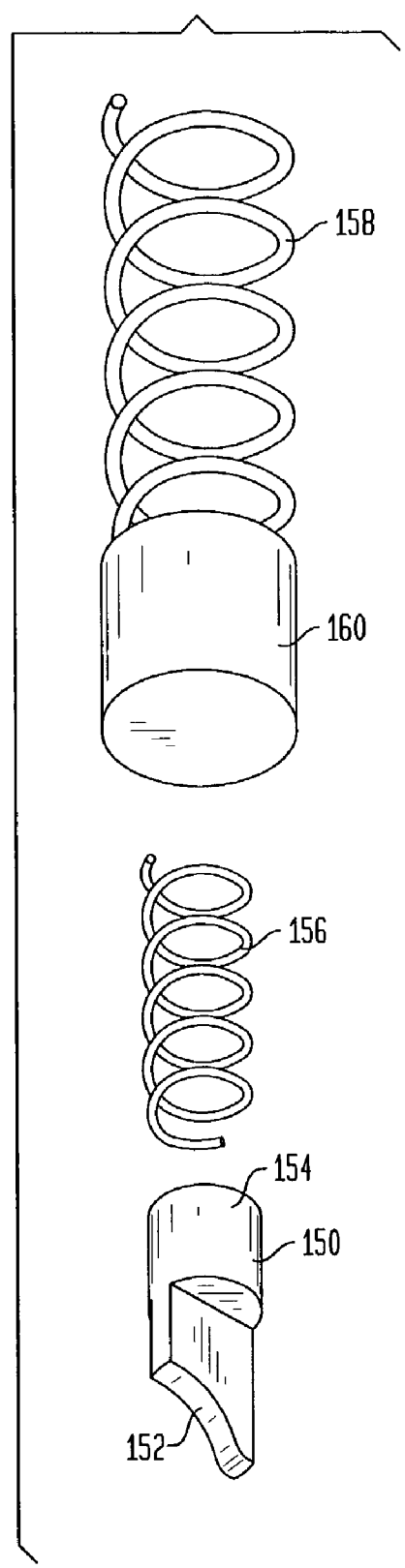
FIG. 8A is an exploded view showing the details of the ejector assembly illustrated in FIG. 8.

The product ejectors of the invention may have a variety of other configurations as shown, for example, in FIGS. 8 through 10A. In FIG. 8 there is shown in perspective a portion of pressure ring 36 provided with contoured surface 104 and a reciprocally mounted product ejectors 150. Ejectors 150 have contoured surfaces 152 matching surface 104 as well as expanded body portions 154. The ejector may be biased with springs 156, 158 on either side of a spacer 160 as shown in FIG. 8A. The ejector operates in much the same manner noted above, but simply reciprocates instead of pivoting like the ejector of FIGS. 2 through 6A. In FIG. 8, the ejector is shown stroked away from surface 104, it being appreciated that in its retracted position there will be small gaps in the outer surface of the pressure ring. The gap, if any, is preferably located radially outwardly from the product forming surfaces of the die set, for example, outwardly with respect to surfaces 60 and 104 noted above which extend to the outer edge of the formed product, thus not influencing the final pressing/formation of the paperboard and pleats.

Figure 9A:
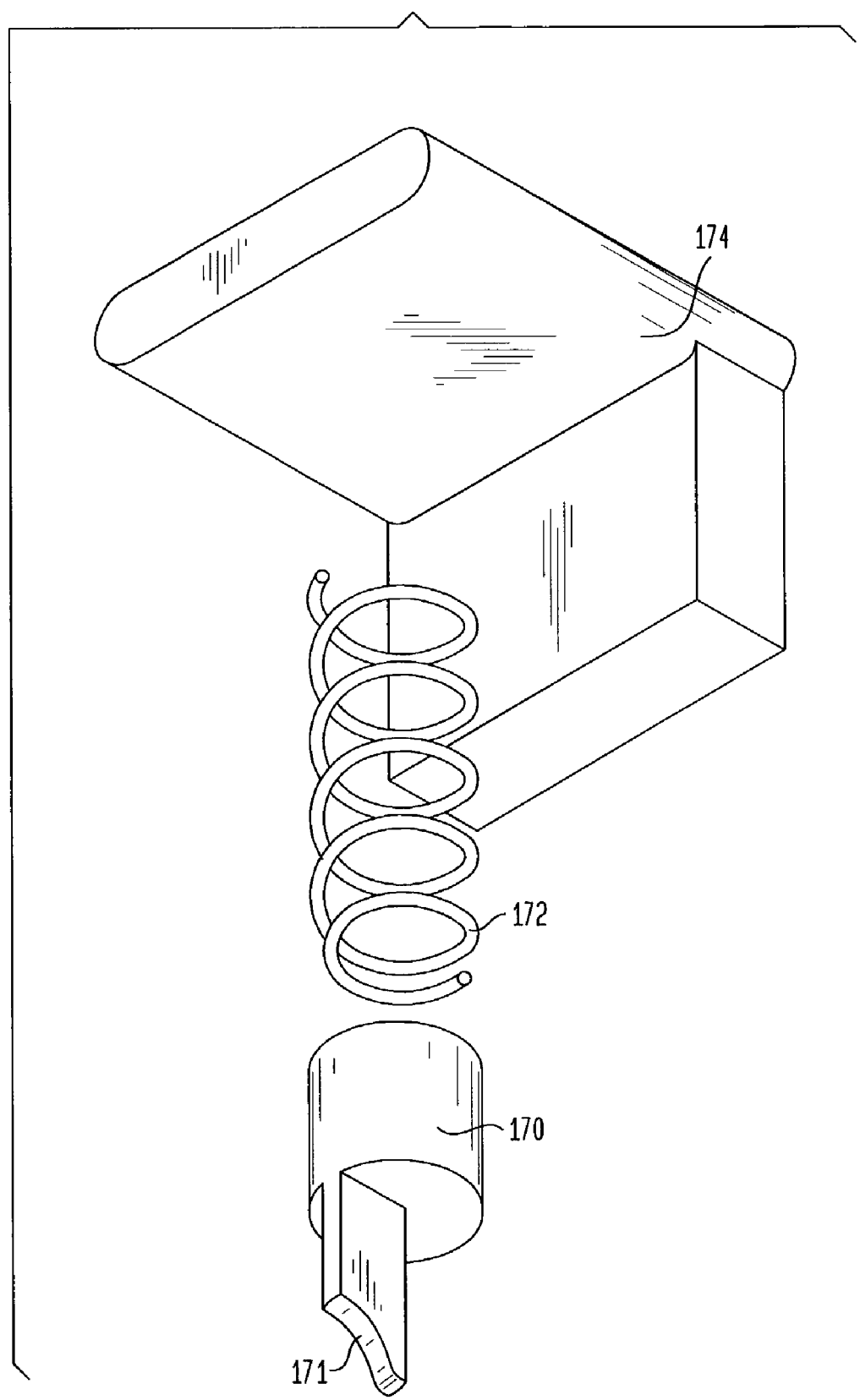
FIG. 9A is an exploded view showing the details of the ejector assembly illustrated in FIG. 9.

Another embodiment of the inventive ejectors is shown in FIGS. 9 and 9A. FIG. 9 is an illustration in perspective of a portion of pressure ring 36 provided with contoured surface 104 and alternately configured ejector members 170 with ejector surfaces 171 shown stroked away from surface 104. Members 170 are biased away from forming surface 104 by springs 172 which contacts a pressure plate 174 as shown in FIG. 9A. Pressure plates 174 also function as stops for the pressure ring 36 and contact the punch base 80 in several locations around its circumference, thus preloading springs 96. Here, an inner edge of the ejector member projects upwardly near the outer edge of the forming surface when stroked away from the pressure ring.

Figure 10:
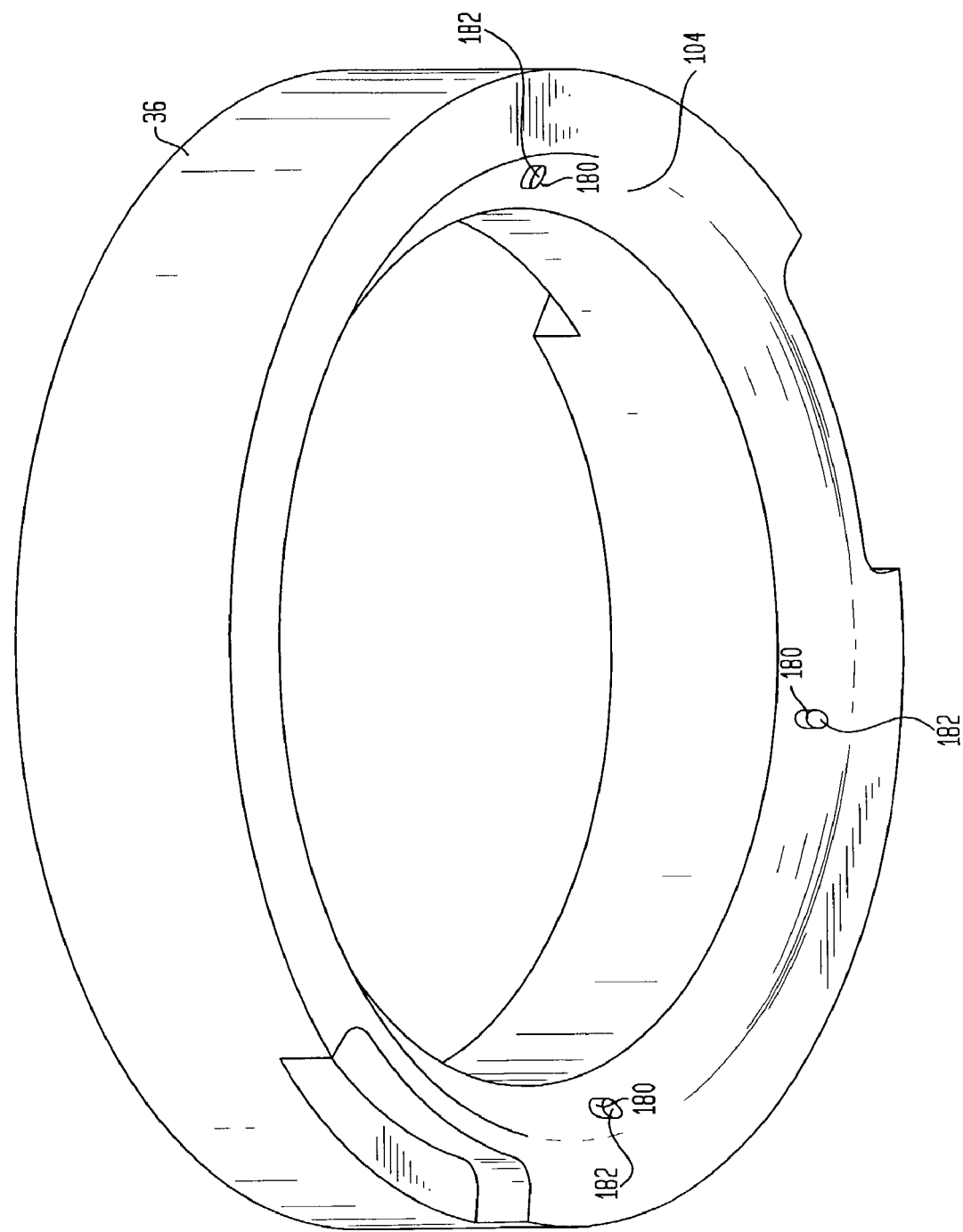
FIG. 10 is a view in perspective of still yet another alternate configuration of a product ejector assembly mounted in a pressure ring of the punch assembly of a pressure die set.
Figure 10A:
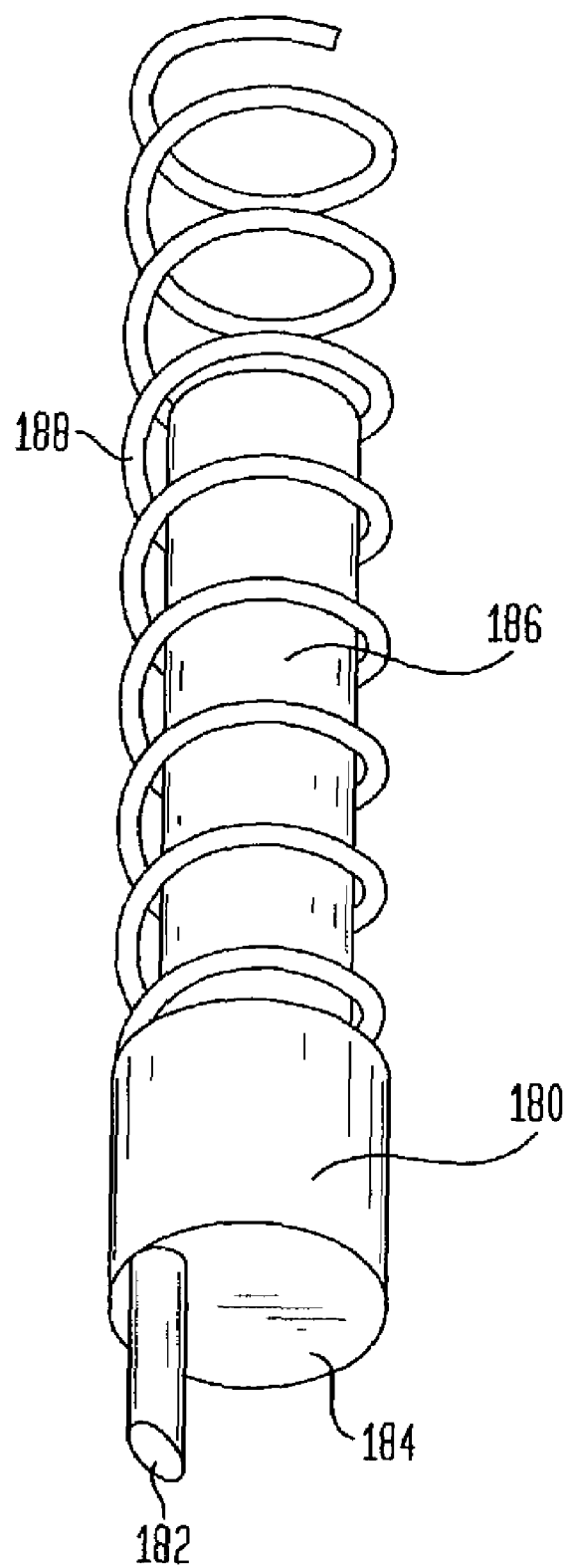
FIG. 10A is an exploded view showing the details of the ejector assembly illustrated in FIG. 10.

Still yet another embodiment may be as shown in FIG. 10. FIG. 10 is a view in perspective of a portion of pressure ring 36 with contour forming surface 104 provided with ejector pins 180 in the middle of the contour. Pins 180 have an ejector surface 182 matching surface 104, shown stroked away from surface 104 in FIG. 10. This style of ejector may have a stop portion 184 and shaft 186 provided with a spring 188 shown in FIG. 10A. The length of shaft 186 may be chosen so that it contacts the punch base at full deflection thus providing press force to surface 182.

The rocker-style ejectors of FIGS. 2 through 6A were found superior to those of FIG. 8 and following in that they did not mar the product. In fact, the plate of FIG. 7 made with rocker-style ejectors had either imperceptible or barely perceptible impressions 190 where the paperboard contacted the ejectors.

While the invention has been described in detail in connection with numerous embodiments, modifications to those embodiments within the spirit and scope of the invention will be readily apparent to those of skill in the art. For example, the ejectors of the improved die set of the invention may contact the sidewall, flange, outer intermediate areas, or outer downturn portions of a formed product to assist in removing the product from the punch. The punch may or may not have a pressure ring with a forming contour as shown in the various Figures. The invention is defined in the appended claims.

What is claimed is:

1. A method of making a pressed a paperboard container comprising:
   (a) positioning a paperboard blank in a pressware die set in an open position, the die set having a punch and die each of which has substantially planar central portions and outer portions corresponding to like portions of the formed container wherein the punch is provided with a plurality of mechanical product ejectors disposed at its outer portions, each of which product ejectors include (i) a movable ejector member defining an ejector surface and (ii) biasing means;
   (b) closing the die set to press the paperboard blank into the container, the forming surfaces at the outer portion of the punch corresponding to a sidewall portion, an intermediate portion and a flange portion of the container; and
   (c) opening the die set, whereupon the biasing means urge the ejector surfaces to project from the forming surfaces of the outer portion of the punch in order to eject the formed container therefrom,
   wherein the plurality of mechanical ejectors include a plurality of rocker members ejectors, pivotally mounted at an outer portion of the punch.

2. The method according to claim 1, wherein the rocker members define the ejector surfaces wherein at least a portion of the ejector surfaces are concave away from the forming surfaces of the punch.

3. The method according to claim 2, wherein the outwardly projecting surfaces of the rocker members are angled inwardly and inclined away from the punch when the ejector surfaces are urged away from the forming surfaces of the punch.

4. The method according to claim 3, wherein the outwardly projecting surfaces of the rocker members extend beyond the perimeter of a paperboard blank positioned for forming in the die set.

5. The method according to claim 1, wherein the ejector surfaces form continuous surfaces with adjacent forming surfaces of the punch when the die set is closed.

6. The method according to claim 5, wherein the collective circumferential span of the ejector surfaces is less than about 10 percent of the circumference of the punch at its outer portion corresponding to the outer edge of the product.

7. The method according to claim 6, wherein the collective circumferential span of the ejector surfaces is less than about 5 percent of the circumference of the punch at its outer portion corresponding to the outer edge of the product.

8. The method according to claim 1, wherein at least three rocker members are spaced around the periphery of the punch.

9. The method according to claim 1, wherein at least four rocker members are spaced around the periphery of the punch.

10. The method according to claim 1, wherein at least five rocker members are spaced around the periphery of the punch.

11. The method according to claim 1, wherein the rocker members are spaced apart at least about 50° around the punch periphery.

12. The method according to claim 1, wherein the rocker members are spaced apart at least about 60° around the punch periphery.

13. The method according to claim 1, wherein the biasing means includes a spring.

* * * * *